Patented Mar. 24, 1925.

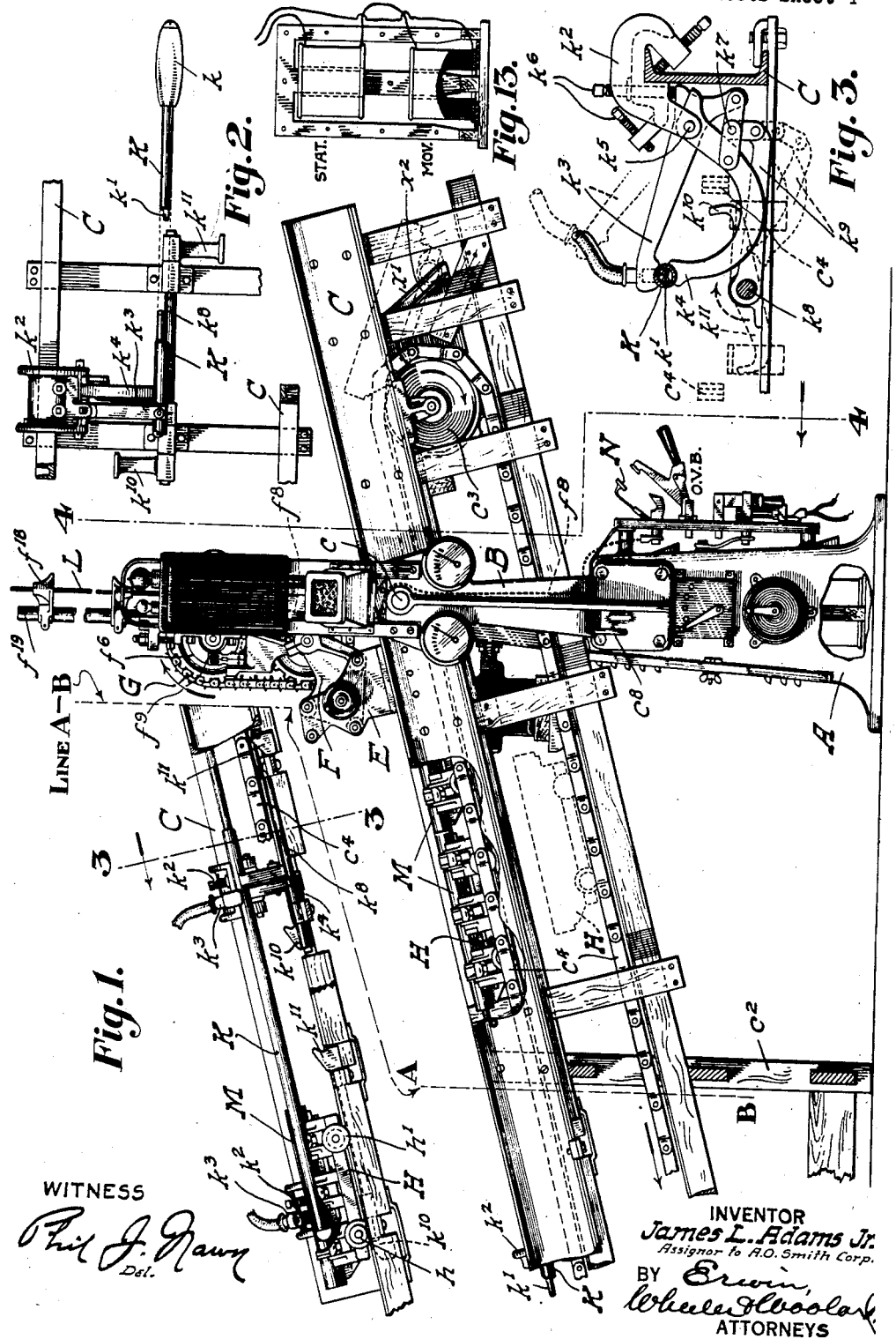

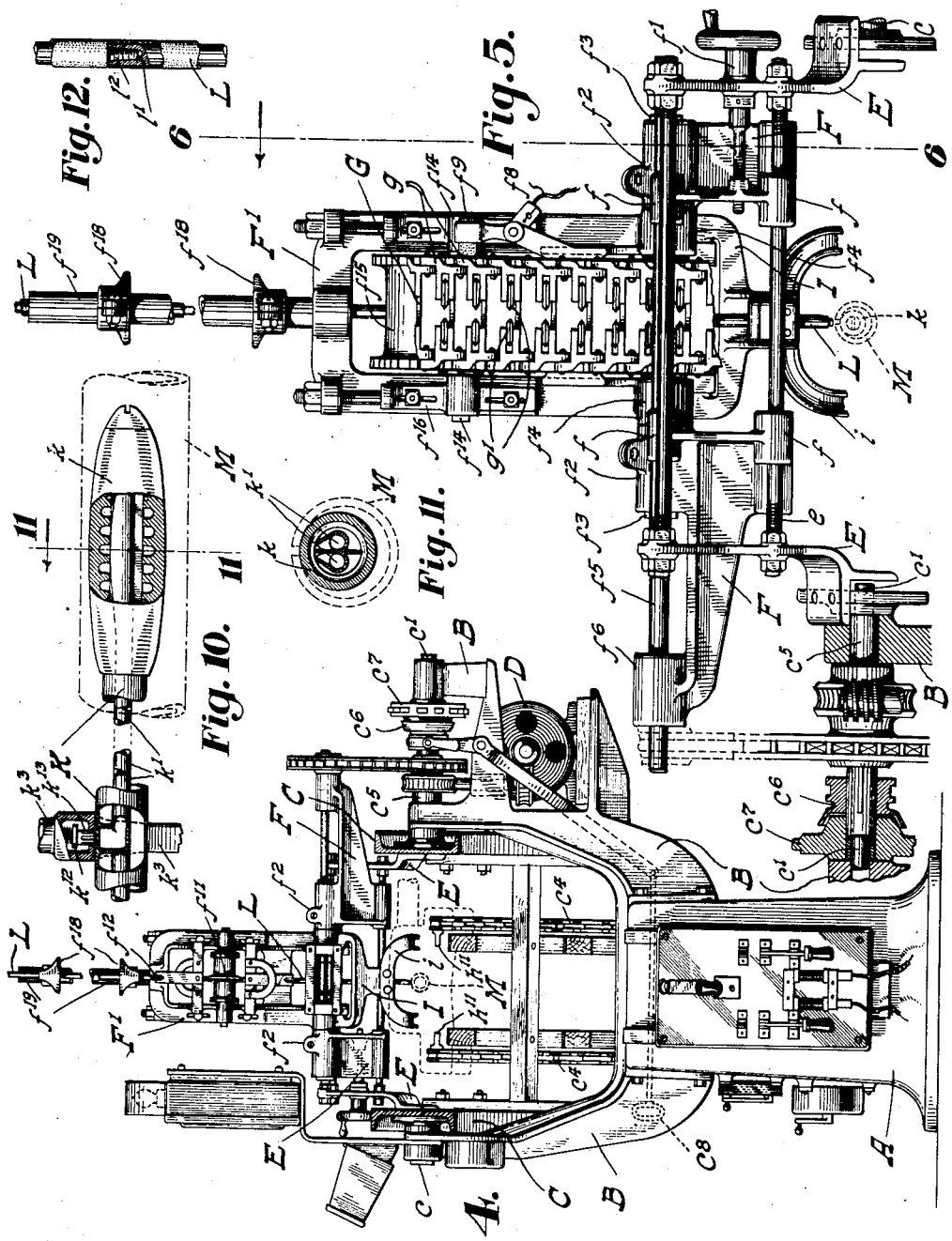

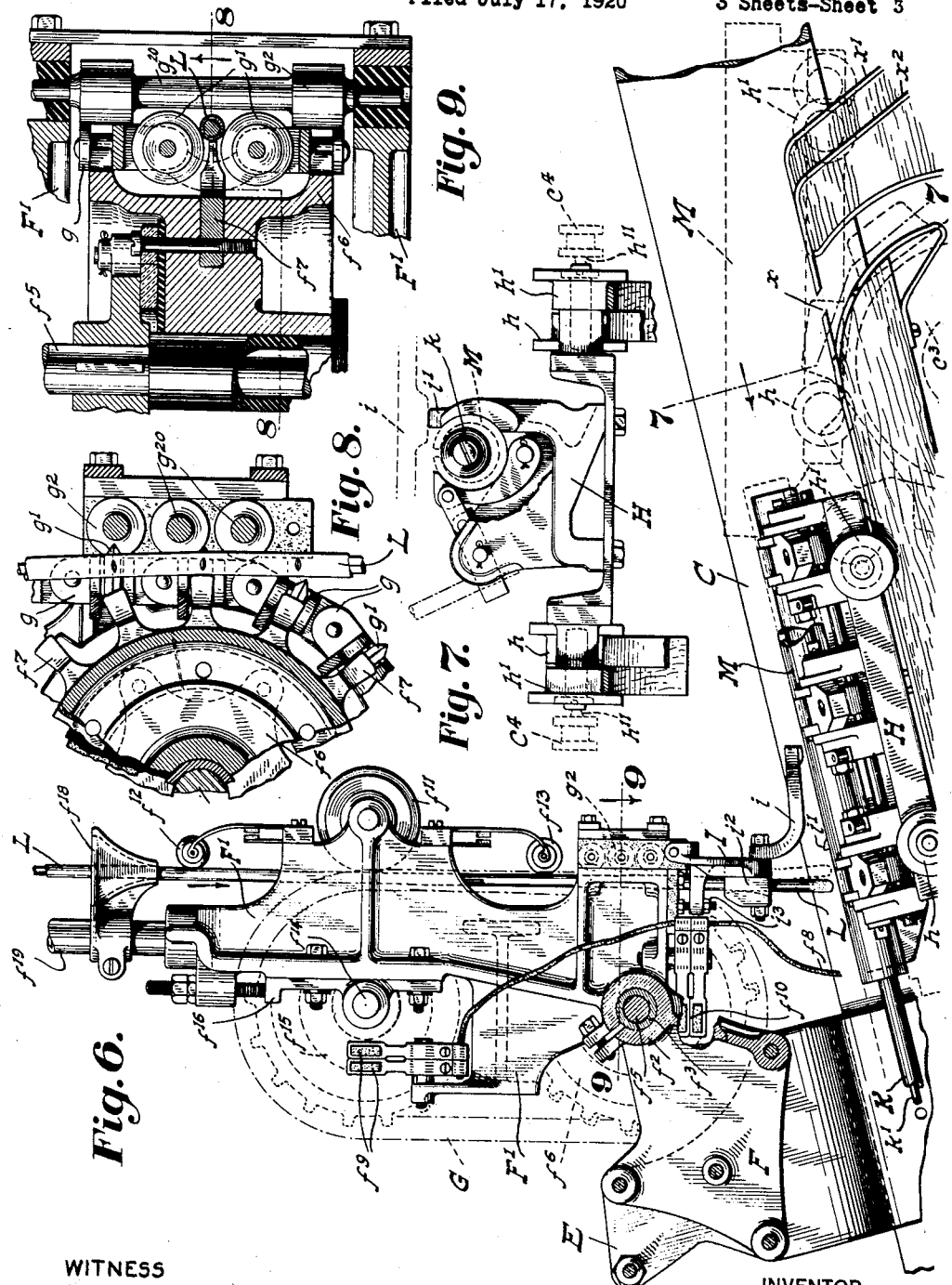

1,530,469

UNITED STATES PATENT OFFICE.

JAMES L. ADAMS, JR., OF MILWAUKEE, WISCONSIN, ASSIGNOR TO A. O. SMITH CORPORATION, OF MILWAUKEE, WISCONSIN, A CORPORATION OF NEW YORK.

AUTOMATIC ARC WELDING MACHINE.

Application filed July 17, 1920. Serial No. 396,946.

*To all whom it may concern:*

Be it known that I, JAMES L. ADAMS, Jr., a citizen of the United States, and resident of the city of Milwaukee, in the county of Milwaukee and State of Wisconsin, have invented a certain new and useful Improvement in Automatic Arc Welding Machines, (Case No. 141); and I do declare the following to be a clear, exact, and complete description thereof, such as will enable persons skilled in the art to which the invention relates to make and use the same, reference being had to the accompanying drawings for disclosure of one construction in which the invention has been embodied.

My invention relates to automatic arc welding machines, in which a succession of articles to be welded is subjected to a welding current supplied by a fusible electrode of the continuous type, whereby the welding arc may be maintained without interruption during the whole of the time that the welding operation is being performed upon such succession of articles.

The apparatus disclosed in this specification has been particularly devised for the purpose of welding the meeting edges of tubular sections, formed from metal strips, which are folded or rolled so that the side edges of such strips are brought into abutting relation. The invention is designed to unite the said meeting edges by an arc welding operation, and thus complete the tubular structure. In forming the tubular sections in the manner described, there exists necessarily a slight separation of the edges, and into the space thus created the arc plays to effect fusion of the meeting edges. At the same time, the molten metal flowing from the fusible electrode enters the open welding line and fills the same to complete the contour of the article.

Heretofore in welding such tubular sections, each of such sections has been presented separately to the welding elements of the machine, the flow of the current being instituted at the commencement of the welding operation upon one section, and terminated upon the completion thereof. The interruptions occasioned in thus singly welding the tubular sections have been time consuming, and have reduced the possible output in a very material degree.

In my improved apparatus the tubular sections are fed to the welding elements of the machine in a continuous procession or succession, and the welding current is supplied by means of a fusible electrode, the molten metal flowing from which is incorporated as an integral part of the joint of the tubular structure. By using what is now known as a continuous electrode, which may be in the form of a rod of exceeding length, or it may be a wire drawn from a reel, the arcing circuit may be maintained without interruption while the tubular sections are moved in succession past the welding point. My improved machine therefore enables me to perform the welding operation upon a succession of articles in such manner that the delay due to the interruptions in the welding operation of the older processes is eliminated, and the output of the welding machine is greatly increased.

My invention involves the use of a series of jigs or carriers forming elements of a chain conveyor, which moves through an inclined path, the tubular sections to be welded being carried by the said jigs or carriers to the point where the welding current is supplied by the fusible electrode. Upon the completion of the welding operation, the jigs of the conveyor return to the starting point, where the welded tubular sections are removed from the jigs and replaced by other sections to be welded.

In some experiments leading up to the development of the present invention, I discovered that a smoother weld was produced where the work was held at an angle so that the point of the electrode followed a downwardly inclined welding line. The present mechanism also embodies means for supporting the work to be welded so that an inclined welding line will be maintained.

My invention also involves the use of a novel arrangement of devices for feeding the fusible electrode in the ratio of the consumption of the latter in the welding operation, so that an approximately constant welding current may be maintained and the welding arc be stabilized during the operation of separately welding the succession of articles.

I employ a cooling mandrel or chill over which the tubular sections are passed when presented to the welding electrode, and have devised novel means for supporting the said mandrel, so that the tubular sections to be welded may be passed thereover in the forward feeding movement of such sections. I have also devised a system of connections whereby the flow of air under pressure through the mandrel may be maintained during the whole of the welding operation, notwithstanding the interruptions of such flow which occur when the tubular sections are placed upon the cooling mandrel.

My invention also resides in the process of welding a succession of articles by means of an arcing current which is maintained continuously and without interruption during the time that such articles are moving in progression past the welding point.

The invention involves other details of construction which will be later described, and the novelty of which will be pointed out in the appended claims.

In the drawings which constitute a part of this specification,

Fig. 1 is a two-part view in front elevation of my improved welding machine, the said part views joining at the line A—B, but separated by reason of the limitations of space upon the drawings; the detached view being upon a scale somewhat reduced from that of the principal view in the figure.

Fig. 2 is a plan view of one of the clamps employed for supporting the cooling mandrel.

Fig. 3 is a sectional view of the same parts, taken on the line 3—3, Fig. 1. and looking in the direction of the arrow.

Fig. 4 is a sectional view on the line 4—4, Fig. 1, looking from the right.

Fig. 5 is an enlarged view looking from the left of Fig. 1, and showing some of the details of the construction.

Fig. 6 is an enlarged partly sectional view on the line 6—6, Fig. 5, and looking in the direction of the arrow.

Fig. 7 is an end view on the line 7—7, Fig. 6, of one of the jigs or carriers for supporting the tubular sections, and showing the divided arrangement of the conveyor track.

Fig. 8 is an enlarged fragmentary and sectional view of the devices for feeding the fusible electrode, the view being taken on the line 8—8, Fig. 9.

Fig. 9 is a horizontal, sectional view of the construction shown in Fig. 6, on the line 9—9.

Fig. 10 is a view partly in section of the cooling mandrel, and showing the provisions for controlling the flow of air thereto.

Fig. 11 shows a cross section through the mandrel, on the line 11—11, Fig. 10.

Fig. 12 shows the manner in which the rod sections forming a continuous electrode may be connected to each other.

Fig. 13 shows in a conventional manner, a device for holding the welding current approximately constant.

In the drawings hereto attached, the base of the machine is indicated by the letter A. A yoke B is mounted upon the base and supports the operating elements of the machine. A conveyor frame C is pivotally mounted upon the yoke by means of a fixed stud $c$ and a shaft $c^1$, which latter has other functions which will be described later. The said conveyor frame is of considerable length and has an inclined arrangement, as shown, being pivotally supported near one end as described, and at the other by means of a stand $c^2$. By feeding the work to be welded through an inclined path, a smoother and more uniform weld is produced, which is free from the pits and irregularities resulting from horizontal welding. This result is due to the opportunity afforded the molten metal under the influence of gravity to adjust itself more evenly over the welding line, by reason of the inclined position in which the work is held during the welding operation. By changing the relative position of the stand $c^2$, the angle of inclination of the conveyor frame may be changed, as described, to make the inclination such as will enable satisfactory results in welding to be achieved. The conveyor frame supports a plurality of sprocket wheels, one of which, $c^3$, is shown, and about the said sprocket wheels a chain conveyor $c^4$ is passed, the purpose of the chain being to convey the jigs or carriers upon which the tubular sections are mounted, to the welding mechanism. The base A is of substantial construction to support the superstructure, and the yoke B is constructed so as to permit the installation of larger conveyor frames, for use in heavy classes of work.

A motor D, mounted at one side of the yoke B, drives the tubular shaft $c^5$, supported by the fixed shaft $c^1$, before referred to, through the arrangement of worms and gears shown in Fig. 4. Brackets E, attached to the conveyor frame, extend upwardly therefrom, and are connected by a series of tie rods $e$, upon which is mounted an adjustable frame F, which latter supports the electrode feeding mechanism. The movable frame F is supported by the tie rods $e$ above mentioned, by means of bosses $f$, sliding on the said tie rods, and is adjustable lengthwise thereof by means of a screw $f^1$, tapped into the said frame, and which passes through one of the brackets E, and is held against longitudinal movement therein. The frame F is provided with split bearings $f^2$, in which are clamped aligned tubular journals $f^3$, projecting from the said bearings toward each other, inside of the yoke. A frame F¹, supporting the electrode feeding mechanism, is connected by means of bosses $f^4$, to the projecting tubular journals $f^3$. By means of the split bearings $f^2$, the electrode feeding mechanism may be rotated upon the tubular journals, and adjusted in a vertical, angular position, so that the desired relation of the electrode and the work in the angular adjustment of the former with reference to the welding line of the latter, may be exactly established.

A shaft $f^5$, journaled for rotation in a bearing $f^6$, extending from the frame F, and in the tubular bearings $f^3$, is driven by a sprocket wheel on one end thereof. Fixed to the said shaft $f^5$, between the ends of the tubular journals $f^3$, is a drum $f^6$, and mounted upon a shaft $f^{14}$ in the upper part of the frame F¹, is a similar drum $f^{15}$, both of such drums being formed with sprocket wheels which effect the movement of the electrode feeding device. The said electrode feeding device is embodied in the form of a chain belt G, of peculiar construction, which will be hereinafter described. The shaft $f^{14}$ is mounted in adjustable bearings $f^{16}$, by means of which the electrode feeding chain belt G, passed about the said drums, may be placed under the desired tension, or slackened, as will be understood from an inspection of Figs. 5 and 6 of the drawings.

The tubular shaft $c^5$ which is driven by the motor D, as described, rotates the clutch member $c^6$ splined upon the said tubular shaft, and designed for engagement with a cooperating clutch face formed on the sprocket wheel $c^7$, loose upon such tubular shaft. The said sprocket wheel $c^7$ transmits motion through a usual sprocket chain to the conveyor mechanism, comprised of the sprocket wheels $c^3$ and conveyor chain $c^4$, for conveying the tubular sections to the welding mechanism, before referred to. The clutch member $c^6$ is operated by means of a hand lever $c^8$, to effect the engagement before mentioned. With the starting of the motor D, the movement of the electrode feeding devices commences, and the welding current being conducted through the electrode, an arc is struck between the electrode and the work, at the moment the conveyor movement of the tubular section takes place, such conveyor movement being brought about by the operation at that instant of the clutch $c^6$.

The device for feeding the fusible electrode as the latter is consumed in the welding operation, will now be described. The electrode will be of such size, and composition as to adapt it for the particular work which it is desired to perform. The feed chain G is composed of a series of links $g$ having the configuration shown in Fig. 5, each link of the chain supporting a pair of spaced pinch rollers $q^1$, adapted to impinge against the electrode L in the feeding movement of the latter, and transmit the welding current to such electrode. The said rollers $g^1$ are shown as sharpened at their peripheries for the purpose of cutting through the coating or covering of the electrode, when an electrode of that type is employed, thus making the contact as with a bare electrode, for the transmission of the current. The links $g$ of the electrode feed chain are held in engagement with the sprocket of the lower drum $f^6$ by means of guiding rollers $g^2$, on a shaft $g^{20}$, mounted in insulated bearings in the frame F¹. The drum $f^6$ is provided with a series of radial clearing devices $f^7$, adapted to clear the electrode from engagement with the cutting rollers $g^1$, as the electrode passes tangentially from its engagement with the said drum $f^6$, the rollers $g^2$ resisting the outward movement of the chain under the thrust of the clearers $f^7$.

The welding current is transmitted by a conductor $f^8$, the course of which is indicated by the dotted line in Fig. 1, through brushes $f^9$, $f^{10}$, bearing upon the ends of the drums $f^6$, $f^{15}$. As the electrode enters the space between the rollers $g^1$, an insulated pressure roller $f^{11}$ forces the engagement of the electrode with the cutting rollers $g^1$, so as to insure a contact being made, the electrode being forced inward until just beyond the center line of each pair of rollers $g^1$, in succession. A spring pressed insulated roller $f^{12}$, is arranged to bear upon the electrode at a point somewhat in advance of the engagement of the electrode with its feeding devices, such spring pressed roller $f^{12}$ being free to close the circuit and operate either a visual or an audible signal when the rear end of the electrode has passed beyond the point of the engagement of the said roller therewith. A light spring pressed insulated indicating roller $f^{13}$ is arranged at a point in advance of where the electrode leaves its engagement with its feeding and contact mechanism, and operates to trip the circuit breaking means N, Fig. 1, and so break the welding circuit, in the event that the end of the electrode passes the roller $f^{12}$, and the signal is not observed, thus preventing the burning out of some of the roller contacts $g^1$, as would occur if the rear end of the electrode passed out from the last pair of rollers, while the welding current was on. It will be understood that the welding devices will be properly insulated at all necessary points.

It being the purpose of the present invention to enable a continuous flow of welding current to be maintained while a succession of articles is subjected to the welding operation, the electrode employed may be in the form of a wire drawn from a reel, as is preferred, or such electrode may be embodied in a more or less straight rod of considerable length. In case the latter arrangement be resorted to, I have found it desirable to provide means for connecting the rear end of one electrode at the time of its approach to complete consumption, to the leading end of a fresh electrode, so that no interruption in the welding operation will occur. I achieve this result by means of the provision shown in Fig. 12, in which the rear end of the electrode L is drilled and tapped as at $l^1$, for the reception of the threaded end of $l^2$ of the next section. The electrodes will be properly guided to their feed devices by means of one or more trumpets $f^{18}$, supported by a post $f^{19}$ extending upwardly from the frame $F^1$.

Fig. 7 shows a front end view of one of the jigs, in which the tubular sections to be welded are clamped in position for presentation to the welding mechanism. Each jig H is provided with two rollers at the front and two at the rear, each of such rollers having a tread portion adapted to travel on the track of the conveyor frame, and provided with a flange at one side, to guide the jig in its movement. The flanges of the rollers at the front end of the jig bear against the outer sides of the tracks over which they move, while the flanges of the rollers at the rear of the jig bear against the inner sides of such tracks. Viewing Figs. 6, and 7, it will be seen that the track is narrowed near its forward end to one-half of its width, the inner portion of each track being cut away, but the outer portion thereof being continuous, excepting for a narrow opening $x$, to permit the downward passage of the pin $h^{11}$, connecting the conveyor chain $c^4$ with the jig H, in the line of the axis of the rear rollers $h$, of the jig. It follows that when the jig H reaches the end of its forward movement over the conveyor track, the axially offset rollers $h^1$, at the front end of the jig, will continue their movement until the end of the track is reached, whereupon such rollers will pass down inclines $x^1$, $x^2$. In the same movement, the rear rollers will reach the cutaway portion of the track and so pass down the rear incline, and so such jig will be lowered to the bottom run of the carrier chain. The purpose in staggering or axially offsetting the front rollers $h^1$, of the jig H, is to enable the latter to pass smoothly and without undue vibration over the break $x$ in the tracks. The carrier chain $c^4$, is provided at points with inwardly projecting adjustable pins $h^{11}$ which engage the jig at its rear end, and thus transmit movement to the jig. In the passage of the carrier chain $c^4$ about the forward sprocket wheel $c^3$, Fig. 1, the engagement of the jig thereto is maintained, and upon the return movement of the chain to the starting point, the jigs are freed therefrom. At such time the tubular section which has been subjected to the welding operation is removed from the jig and a fresh section to be welded may be placed therein, after which the jig will be connected with the moving carrier chain $c^4$ for transmission again to the welding mechanism.

While it is my purpose in practicing the present invention to feed the tubular sections, indicated M, in close succession to the welding mechanism, I find it may sometimes be necessary to provide means for bridging the arc over the space existing between the abutting ends of the tubular sections, in order to prevent burning of the material at the end of one section, and at the commencement of another. To effect this result, I have constructed means which, as the rear end of the tubular section reaches the welding point, will act to move the end of the electrode bodily at the moment of the completion of the welding operation upon such tubular section, and upon such completion, to free the electrode so that it will snap back into normal position, to transfer the arc across the space and to the leading end of the succeeding tubular section. The means which I have devised for this purpose consists in a pivoted guide piece I, depending from the lower part of the frame $F^1$, and provided with a finger $i$, the tip of which is in position to be engaged by a projection $i^1$ mounted upon the jig H. As the latter moves the rear end of the tubular section past the welding electrode, the said projection $i^1$ will engage the finger $i$ and rock the pivoted member I, so that the latter will move the tip of the electrode a little out of its normal position. As soon as the said projection passes from under the tip of the finger, the resiliency possessed by the electrode will cause it to immediately resume its former position, and thus bridge the space between the tubular sections by transferring the arc, without the damage which would otherwise result. The member I is provided with a guiding eye, $i^2$ through which the electrode is passed. An adjusting screw $i^3$ determines the vertical position of the said guiding eye with reference to the electrode.

Fig. 7 shows a simple form of toggle-actuated clamping mechanism for holding the tubular sections in correct position upon the jig. By means of the adjusting screw $f^1$, the point of the electrode may be accurately positioned with respect to the welding line of the tubular sections.

The tubular sections to be welded are formed with their meeting edges in close proximity, leaving only a narrow seam or opening which is to be closed by fusing such edges and filled by incorporating in the joint thereof the fused metal flowing from the destructible electrode. With tubular sections so formed, it is necessary to provide some means whereby such sections may be placed over the cooling mandrel. As shown in Fig. 10, the said mandrel K is provided with a head $k$, of copper or other convective material, into which the cooling fluid, air in the present instance, is introduced by means of circulation pipes $k^1$ arranged within the said mandrel. The mandrel is supported by two alternately operating clamps $k^2$, adjustably mounted upon one of the side rails of the conveyor mechanism. Each of such clamps is composed of two jaws $k^3$, $k^4$ pivoted at $k^5$ to their attaching member, which latter is provided with adjustable stops $k^6$, adapted to limit the outward movement of the clamping jaws. A toggle point $k^7$ connects the clamping jaws of each clamp, so that the jaws of each clamp are opened and closed simultaneously. A rock shaft $k^8$ mounted in the frame of the conveyor mechanism is provided with a radial arm $k^9$, by means of which the toggle joint is moved to actuate the clamping jaws. The said rock shaft is provided with other radial arms $k^{10}$ and $k^{11}$, Fig. 2. The jig as it is pushed by hand on to the runway, will act to depress the arm $k^{10}$ and oscillate the shaft to break the toggle and separate the clamping jaws, to disengage the rear pair from engagement with the cooling mandrel. This jig, supporting a new tubular section to be welded, is then pushed up on the runway, the free end of the relatively fixed cooling mandrel entering the said tubular section. The further movement of the jig will engage the cam $k^{11}$, and reverse the direction of rotation of the rock shaft $k^8$, so as to bring the clamping jaws $k^3$ and $k^4$ into supporting engagement with the cooling mandrel, at the rear of the tubular section.

While the clamping fingers of the mechanism described are separated to permit the movement of a tubular section over the free end of the cooling mandrel, the mandrel is, for the moment, supported by the second clamping mechanism, and when the jig reaches such second clamping mechanism, the latter is operated in the same manner as that first described, to permit the movement of the tubular section to a further advanced position upon the mandrel, such mandrel being at this time sustained by such first described clamping mechanism. After the tubular section has passed both of the clamps, the jig supporting the same is advanced by hand until the leading end of such tubular section abuts against the rear end of the section already in place on the mandrel. From this moment the conveyance of the tubular sections to the welding devices is effected automatically by the operation of the carrier chain.

The clamping jaw $k^3$ is provided with a hose connection by means of which the flow of cool air is conducted to the cooling mandrel, and an automatic valve $k^{12}$ controls the flow of the air. See Fig. 10. The outlet of the hose connection of the jaw $k^3$ registers with an inlet in the mandrel K, leading to the supply pipe. The valve $k^{12}$ is provided with a stem $k^{13}$, adapted to contact with the mandrel and unseat the valve against the force of its spring and the fluid pressure, at the moment the clamping jaws engage the mandrel. This action opens the valve for the flow of the air through the hose connection to the cooling head of the mandrel. The other set of clamping jaws will be provided with similar valve mechanism for permitting the flow of the air through the second inlet pipe $k^1$. The said pipes are provided with slitted openings, as shown in Fig. 11, to discharge the currents of air against the inner side of the cooling head $k$, and thus chill the work at the line of the weld. The flow of air is maintained during the welding operation, although relaxed in part, when the jaws of one of the clamps are separated and disengaged from the mandrel for the moment, to permit the movement of a section into position on the mandrel.

In the operation of my invention, the articles constituting the work to be welded are fed in succession past the fusing point of the electrode at a ratio which is constant with respect to the rate of consumption of the latter, but this relative rate of travel of the work, and hence the depth and heat of the weld, may be varied by changing the size of conveyor gear, driven by sprocket $c^7$, Fig. 4, when desirable.

By the use of my invention, I am able to practice a continuous welding operation upon a series or succession of articles, and by maintaining an unbroken welding current of constant value, I eliminate the delays incident to the older processes of welding, and greatly increase the output in a given time. A direct current may be supplied to the motor D, to induce the several mechanical movements described; also, an alternating current may be conducted to the electrode for fusing the latter in the welding operation.

My construction also provides means for automatically holding the welding current and the voltage across the welding arc fairly constant, the base A being preferably made hollow so as to contain the current regulating means, and provision made above for automatically varying the speed of driving motor D, so as to keep the arc voltage approximately constant, and for stopping the motor D, in case the arc for any reason becomes extinguished.

Having thus described my invention, what I claim and desire to secure by Letters Patent of the United States, is:

1. In an arc welding apparatus, an electrode for conducing the welding current to the work to be welded, and means for supporting and presenting in succession to the electrode a series of articles to be welded, whereby a constant welding arc may be maintained and such succession of articles welded without interrupting the current.

2. In an arc welding apparatus, an electrode for conducting the welding current to the work to be welded, and conveyor means provided with devices for supporting and presenting in succession to the electrode a series of articles to be welded, whereby a constant welding arc may be maintained and such succession of articles welded without interrupting the current.

3. In an arc welding apparatus, an electrode for conducting the welding current to the work to be welded, and means for supporting and presenting in succession to the electrode a series of articles to be welded, and means for bridging the arc over the space between successive articles, whereby the welding current may be maintained during the welding of such succession of articles.

4. In an arc welding apparatus, an electrode for conducting the welding current to the work to be welded, and conveyor means provided with devices for supporting and presenting in succession to the electrode a series of articles to be welded, and means for bridging the arc over the space between successive articles, whereby the welding current may be maintained during the welding of such succession of articles.

5. In an arc welding apparatus, an electrode for conducting a welding current to the work to be welded, a carrier for supporting and presenting in succession to the electrode a series of articles to be welded, and devices for bridging the arc over the gap between successive articles, whereby a continuous welding current is maintained.

6. In an arc welding apparatus, an electrode for conducting a welding current to the work to be welded, means for supporting and presenting in succession to the electrode a series of articles to be welded, and means for bridging the arc over the gap between successive articles, whereby the welding current is maintained without interruption.

7. In an arc welding apparatus, electrode feeding means provided with a pivoted guide for the end of the electrode, a conveyor mechanism comprising jigs for supporting and presenting to the electrode successive articles to be welded, and means on the jigs to engage the said pivoted guide and move the end of the electrode to cause it to bridge the arc over the gap between successive articles.

8. In an arc welding apparatus, means for feeding a fusible electrode to the work to be welded, and jigs for supporting the work to be welded and advancing such work in succession past the fusing end of the electrode, without interruption of the welding current.

9. In an arc welding apparatus, a fusible metallic electrode for conducting the welding current to the work to be welded, mechanism for conveying a series of articles to the electrode to be separately welded in succession, and means for feeding the electrode to the work in the ratio of the consumption of the electrode, whereby the welding arc is maintained without interruption during the welding of such succession of articles.

10. In an arc welding apparatus, electrode feeding devices comprising a chain, and drums about which the chain passes, the chain being provided with means for engaging the electrode to feed the latter during the movement of the chain.

11. In an arc welding apparatus, electrode feeding devices comprising a chain, and drums about which the chain passes, the links of the chain being provided with means to engage the electrode and conduct the welding current thereto, during the movement of the chain.

12. In an arc welding apparatus, electrode feeding devices comprising a chain, drums about which the chain passes, the links of the chain being provided with means for engaging the electrode to feed the latter during the movement of the chain, and means to disengage the electrode from the chain.

13. In an arc welding apparatus, devices for feeding a covered electrode to the work to be welded, such devices being provided with means to cut the covering of the electrode and conduct the welding current to the latter.

14. In an arc welding apparatus, means for feeding a fusible electrode to the work to be welded, in combination with devices to indicate the exhaustion of the electrode, such devices including electric circuit connections normally held open by the presence of electrode material.

15. In an arc welding apparatus, mechanism for feeding a fusible electrode to the work to be welded, in combination with means to indicate the exhaustion of the electrode, such means including devices rendered normally inoperative by the presence of electrode material.

16. In an arc welding apparatus, a laterally movable frame upon which the electrode feeding means is mounted, a jig traveling in a fixed path for presenting the work to be welded to the electrode, and means for moving the said frame to adjust the end of the electrode laterally with reference to the welding line of the work.

17. In an arc welding apparatus, a welding electrode, a work conveyor, jigs operated by the conveyor for supporting and presenting to the electrode the work to be welded, and means for returning the jigs to the starting point upon completion of the welding operation.

18. In an arc welding apparatus, a welding electrode, an endless conveyor for the work, jigs operated by the conveyor for supporting and presenting to the electrode the work to be welded, and means for directing the jigs to the return run of the conveyor upon completion of the welding operation.

19. In an arc welding apparatus for welding a succession of tubular sections, an electrode, a cooling mandrel adjacent the point thereof, and separable connections for supporting the mandrel, whereby the sections to be welded may be passed over the said mandrel and into welding position.

20. In an arc welding apparatus for welding a succession of tubular sections, an electrode, a relatively stationary cooling mandrel adjacent the point thereof, separable supporting means for the mandrel, whereby the sections to be welded may be passed over the said mandrel and into welding position.

21. In an arc welding apparatus for welding a succession of tubular sections, a cooling mandrel, separable means for supporting the mandrel in a relatively stationary position and for conducting cooling fluid to the mandrel, whereby the sections to be welded may be passed over the said mandrel and into welding position.

22. In an arc welding apparatus, a cooling mandrel, alternately acting clamps for supporting the said mandrel in a relatively stationary position, and means for opening and closing the said clamps, whereby the sections to be welded may be passed over the mandrel and into welding position during the alternating operations of the clamps.

23. In an arc welding apparatus for welding a succession of tubular sections, a welding electrode, a cooling mandrel adjacent the point thereof, separable supporting means for the mandrel, and hose connections leading to the said supporting means, whereby the sections to be welded may be passed over the mandrel and into welding position during the separation of the said supporting means.

24. In an arc welding apparatus, a welding electrode, a cooling mandrel adjacent the point thereof, separable supporting means for the mandrel, means for conducting cooling fluid to the mandrel, and means for preventing the flow of fluid during the separation of the supporting means, whereby the sections to be welded may be passed over the mandrel and into welding position.

25. In an arc welding apparatus, a welding electrode, a fluid cooled mandrel adjacent the point thereof, separable supports for the mandrel, connections for conducting fluid to the mandrel, and means for preventing the flow of fluid in such of the supports as are separated for the insertion over the mandrel of a section to be welded.

26. In an arc welding apparatus, a fusible electrode for conducting a welding current to the work to be welded, carrier means embracing a plurality of clamping jigs for supporting and presenting to the welding electrode a succession of parts to be welded, and means for feeding such parts to the welding point in succession in the ratio of the consumption of the electrode, together with means whereby a welding current of approximately constant value is maintained during the welding of such succession of parts.

27. In an arc welding apparatus, a fusible metallic electrode for conducting the welding current to the work, means for feeding the electrode, a carrier device for supporting and presenting to the electrode a succession of parts to be welded, and means for actuating the carrier synchronously with the feeding of the electrode, together with means whereby a welding current of approximately constant value is maintained during the welding of such succession of parts.

28. In an arc welding apparatus, means for feeding a current conducting fusible electrode, and means for synchronously feeding to the electrode a succession of parts to be welded, together with means whereby a welding current of approximately constant value is maintained during the welding of such succession of parts.

29. In an arc welding apparatus, a fusible electrode for conducting a welding current, means for supporting and conveying to the electrode a succession of parts to be welded, means for synchronizing the feeding movements of the electrode and the said supporting and conveying means, together with means whereby a welding current of approximately constant value may be maintained during the welding of such succession of parts.

30. That process of arc welding, which consists in conveying a succession of parts to be welded into the arc of a fusible electrode, feeding the electrode to the work in the ratio of the conveying movement of the succession of parts, and maintaining an uninterrupted welding current of approximately constant value during the feeding of the electrode and movement of the succession of parts, to fuse the electrode and progressively unite the parts.

31. That process of electric arc welding, which consists in presenting to the arc of a fusible electrode a succession of parts to be separately welded, fusing the electrode upon the work in the ratio of the presentation of the successive parts, and maintaining the arc uninterruptedly during such presentation and fusion, to progressively unite the parts.

32. That process of electric arc welding, which consists in presenting in progressive order a succession of parts to be welded at the point of a current conducting electrode, establishing a welding current in the electrode, and maintaining the arc uninterruptedly during the presentation of the succession of parts to unite such parts in progressive order.

33. That process of welding a succession of parts by means of an electric arc, which consists of feeding such succession of parts past the point of a current conducting electrode, maintaining uninterruptedly a welding current in the said electrode, and moving the point of the electrode to bridge the gap between abutting parts during the feeding movement of the succession of parts.

34. That process of welding a succession of parts by means of an electric arc, which consists in feeding such succession of parts past the end of a fusible electrode, feeding the electrode to the work, maintaining uninterruptedly a welding current to sustain the arc and fuse the electrode at the welding point during the feeding movement of the parts to be welded, and moving the end of the electrode to bridge the gap between abutting parts during such feeding movement.

35. In an electric welding apparatus, means for supporting the work with the line to be welded in an inclined position, an electrode for conducting the welding current, and means for moving the work and electrode one with relation to the other so that the electrode follows the inclined line downwardly in the welding operation.

36. In an electric welding apparatus, means for supporting the work with the welding line extending downwardly, an electrode for conducting the welding current and means for moving the work while so supported past the point of the electrode.

37. In an electric welding apparatus, an electrode for conducting the welding current, a conveyor traveling an inclined path and adapted to support the work with the welding line thereof downwardly inclined, and means for actuating the conveyor to move the work while so supported past the point of the electrode.

38. The process of welding articles in a continuous operation, which consists in feeding such articles in succession with their open welding lines in alignment past the welding point, progressively fusing the metal in the region of the welding lines and filling the open welding lines with molten welding material to complete the contour of the article and produce integral structures.

39. In metal working by electricity, the steps which consist in establishing an arc between the work and a suitable electrode, relatively moving such work and electrode to cause the latter to follow the line to be welded, and at the same time so positioning such work and electrode that the portion of the line in question under the arc inclines downwardly in the direction of travel of the electrode relatively to the work.

40. In metal working by electricity, the steps which consist in establishing an arc between the work and a suitable electrode, relatively moving such work and electrode to cause the latter to follow the line to be welded, and at the same time tilting the work so that the portion of the line in question under the arc inclines downwardly in the direction of travel of the electrode relatively to the work.

In testimony whereof, I have signed my name at Milwaukee, this 13" day of July, 1920.

JAS. L. ADAMS, JR.

Witnesses:
W. F. WOOLARD,
C. THEO. OSTERBERG.